United States Patent
Kobayashi et al.

(10) Patent No.: US 7,909,469 B2
(45) Date of Patent: Mar. 22, 2011

(54) IMAGE PROJECTING APPARATUS AND IMAGE PROJECTING METHOD FOR USE IN THE SAME

(75) Inventors: Izushi Kobayashi, Tokyo (JP); Yutaka Sugawara, Tokyo (JP); Akihiro Kojima, Kanagawa (JP); Akira Nakamura, Tokyo (JP); Katsuhisa Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 12/080,904

(22) Filed: Apr. 7, 2008

(65) Prior Publication Data

US 2008/0284988 A1    Nov. 20, 2008

(30) Foreign Application Priority Data

May 18, 2007  (JP) ............... P2007-133529

(51) Int. Cl.
G03B 21/28 (2006.01)
G02B 26/08 (2006.01)

(52) U.S. Cl. ...... 353/51; 353/99; 359/201.1; 359/201.2; 359/225.1

(58) Field of Classification Search ........ 353/50, 353/51, 98, 99, 71; 359/201.1, 201.2, 212.1, 359/212.2, 217.2, 223.1, 225.1, 226.1, 207.8
See application file for complete search history.

(56) References Cited

U.S. PATENT DOCUMENTS

| | | | | |
|---|---|---|---|---|
| 4,978,202 A | * | 12/1990 | Yang | 349/15 |
| 4,979,030 A | * | 12/1990 | Murata | 348/196 |
| 5,140,427 A | * | 8/1992 | Nakane et al. | 348/759 |
| 5,365,288 A | * | 11/1994 | Dewald et al. | 353/98 |
| 7,271,938 B2 | * | 9/2007 | Kawamura et al. | 358/509 |
| 7,697,183 B2 | * | 4/2010 | Malyak et al. | 359/210.1 |
| 2009/0185249 A1 | * | 7/2009 | Obi et al. | 359/198.1 |

FOREIGN PATENT DOCUMENTS

JP    2003-207730    7/2003

* cited by examiner

*Primary Examiner* — William C Dowling
(74) *Attorney, Agent, or Firm* — Robert J. Depke; Rockey, Depke & Lyons, LLC

(57) ABSTRACT

Disclosed herein is an image projecting apparatus, including: a one-dimension type light modulating device for modulating a light in accordance with image information; a projection optical system; and a light deflecting device for deflecting an image light in a direction approximately perpendicular to an extension direction of a one-dimensional image light emitted from the one-dimensional light modulating device; wherein the light deflecting device is composed of a first light deflecting device arranged between the projection optical system and the one-dimension type light modulating device, and a second light deflecting device arranged on an emission side of the projection optical system; the second light deflecting device is detachably mounted.

14 Claims, 3 Drawing Sheets

IMAGE PROJECTING APPARATUS AND IMAGE PROJECTING METHOD FOR USE IN THE SAME

CROSS REFERENCES TO RELATED APPLICATIONS

The present invention contains subject matter related to Japanese Patent Application JP 2007-133529 filed in the Japan Patent Office on May 18, 2007, the entire contents of which being incorporated herein by reference.

BACKGROUND OF THE INVENTION

1. Field of the Invention

The present invention relates to an image projecting apparatus for scanning and projecting an image light which is obtained by optically modulating a light in accordance with image information by a one-dimension type light modulating device to display a two-dimensional image corresponding to the image light, and an image projecting method for use in the same.

2. Description of the Related Art

A high resolution, a wide color gamut, a wide view angle, and a high frame rate are demanded as requirements for a high-realistic sensation display. When the wide view angle is intended to be realized by means of one projector, i.e., one image projecting apparatus, a method of projecting an image on a big screen or curved surface screen by means of a two-dimension type spatial light modulating device such as a liquid crystal panel or a digital micromirror device (DMD) is generally used. In such a case, since the image quality is deteriorated in end portions, especially, four corners of a screen, at present, the image quality and the wide view angle may not go together.

On the other hand, a one-dimension type spatial light modulating device (hereinafter referred to as "a one-dimension type light modulating device") emits a one-dimensional image light extending in a direction along which light modulating elements are arranged so as to correspond to pixels, respectively, i.e., in a major axis (longitudinal) direction of the one-dimension type light modulating device. Therefore, a combination of the one-dimension type light modulating device and a light deflecting device, such as a scanning mirror, for scanning an image light in a direction perpendicular to a major axis thereof, i.e., a so-called scanning element allows a two-dimensional image to be displayed on a screen.

Also, in the case where a post-projection scan system having a light deflecting device arranged in a subsequent stage side, i.e., an emission side of a projection optical system including a projection lens or the like is adopted in an image projecting apparatus using the one-dimension type light modulating device, the wide view angle is readily realized in a narrower projection space. In addition, in the case where a cylindrical screen is used as a projection image plane, there is an advantage that a degree of deterioration of the image in four corners of a screen is small, and thus the wide view angle can be realized without impairing the image quality. This technique, for example, is described in Japanese Patent Laid-Open No. 2003-207730.

In addition, in the case where a pre-projection scan system having a scanning section arranged in front of a projection lens is adopted in the image projecting apparatus using the one-dimension type light modulating device, constructing a correction lens system having a combination of a projection lens and an aspherical lens results in that a rectangular image can be projected without correcting an image signal.

SUMMARY OF THE INVENTION

Use of the one-dimension type light modulating device as described above makes it possible to display an image having a wider transverse view angle. That is to say, it is possible to project an image having a large ratio of a transverse length to a longitudinal length (horizontal to vertical ratio), i.e., a large aspect ratio. As a result, the realistic sensation can be further increased.

Provision of an apparatus provided with both a function of projecting an image having such a relatively large aspect ratio, and a function of projecting an image having a relatively small aspect ratio having the same degree of a transverse view angle as that of existing one, for example, increase the degree of freedom in selection of image software. This leads to that the utility value can be further enhanced.

However, there has been proposed no image projecting apparatus only with which the two projection methods described above are realized. At present, it is necessary to prepare a plurality of image projecting apparatuses for such a case. When a plurality of image projecting apparatuses are used, there is a problem that the construction of the entire apparatuses is scaled up and complicated.

In the light of the foregoing, the present invention is designed to provide an image projecting apparatus which is capable of projecting images having different aspect ratios while suppressing deterioration of respective image qualities, and simply switching the projection methods using different systems over to each other, and an image projecting method for use in the same.

In order to attain the desire described above, according to an embodiment of the present invention, there is provided an image projecting apparatus including: a one-dimension type light modulating device for modulating a light in accordance with image information; a projection optical system; and a light deflecting device for deflecting an image light in a direction approximately perpendicular to an extension direction of a one-dimensional image light emitted from the one-dimensional light modulating device; in which the light deflecting device is composed of a first light deflecting device arranged between the projection optical system and the one-dimension type light modulating device, and a second light deflecting device arranged on an emission side of the projection optical system. The second light deflecting device is detachably mounted.

According to another embodiment of the present invention, there is provided an image projecting apparatus including: a one-dimension type light modulating device for modulating a light in accordance with image information; a projection optical system; and a light deflecting device for deflecting an image light in a direction approximately perpendicular to an extension direction of a one-dimensional image light emitted from the one-dimensional light modulating device; in which the light deflecting device is composed of a first light deflecting device arranged between the projection optical system and the one-dimension type light modulating device, and a second light deflecting device arranged on an emission side of the projection optical system; and an optical system arranged in the second light deflecting device, or between the second light deflecting device and the projection optical system is provided with a movement mechanism.

According to still another embodiment of the present invention, there is provided an image projecting method, including the steps of: emitting an image light obtained by modulation by a light modulating device through a first light deflecting device and a projection optical system to project an image light having a first aspect ratio; and emitting an image light obtained by modulation by the light modulating device through a second light deflecting device arranged on an emission side of the projection optical system to project an image light having a second aspect ratio different from the first aspect ratio.

As has been described so far, according to the embodiments of the present invention, the image projecting apparatus for deflecting the image light obtained by modulation by the one-dimension type light modulating device by the light deflecting device, and projecting the resulting image on an external image production surface such as a screen by the projection optical system, thereby performing the image projection is provided with the first and second light deflecting devices. Also, the first light deflecting device is arranged between the one-dimension type light modulating device and the projection optical system, and the second light deflecting device is arranged on the emission side of the projection optical system. That is to say, when the first light deflecting device is used, the projection using the pre-projection scan system becomes possible while when the second light deflecting device is used, the projection using the post-projection scan system becomes possible.

In addition, according to the embodiments of the present invention, the second light deflecting device is detachably mounted, which results in that it can be simply selected whether the light is deflected, thereby performing the projection by means of the first light deflecting device, or the light is deflected, thereby performing the projection by means of the second light deflecting device.

Moreover, the second light deflecting device is provided with the movement mechanism, or the optical system, such as a folded mirror, provided between the second light deflecting device and the deflection optical system is provided with the movement mechanism, which results in that the deflection and projection by the first light deflecting device, and the deflection and projection by the second light deflecting device can be simply switched over to each other similarly to the above case.

As a result, the deflection is performed by means of the first light deflecting device with the second light deflecting device being detected or moved from a position on the emission optical path of the projection optical system, thereby allowing the projection using the pre-projection scan system for scanning the image light before the image light is made incident to the projection optical system. On the other hand, the deflection is performed by means of the second light deflecting device with the operation of the first light deflecting device being stopped, thereby allowing the projection as well using the so-called post-projection scan system for scanning the image light after the image light is emitted from the projection optical system. Consequently, according to the embodiments of the present invention, the projection methods using the two systems, respectively, can be simply switched over to each other. That is to say, the images having the different aspect ratios can be projected while the deterioration of the respective image qualities is suppressed.

In addition, according to the still another embodiment of the present invention, as described above, the image projecting method includes the steps of: emitting an image light obtained by modulation by a light modulating device through a first light deflecting device and a projection optical system to project an image light having a first aspect ratio; and emitting an image light obtained by modulation by the light modulating device through a second light deflecting device arranged on an emission side of the projection optical system to project an image light having a second aspect ratio different from the first aspect ratio. Therefore, the image lights having the different aspect ratios can be simply switched over to each other, and the constructions of the deflection devices are made different from each other. As a result, the deterioration of the image qualities can be suppressed in the two projection methods.

According to the image projecting apparatus and the image projecting method of the present invention, the images having the different aspect ratios can be projected while the deterioration of the respective image qualities can be suppressed, and also the projection methods using the two systems, respectively, can be simply switched over to each other.

DETAILED DESCRIPTION OF THE PREFERRED EMBODIMENTS

Although embodiments of the present invention will be described in detail hereinafter, the present invention is by no means limited thereto.

Figure 1:
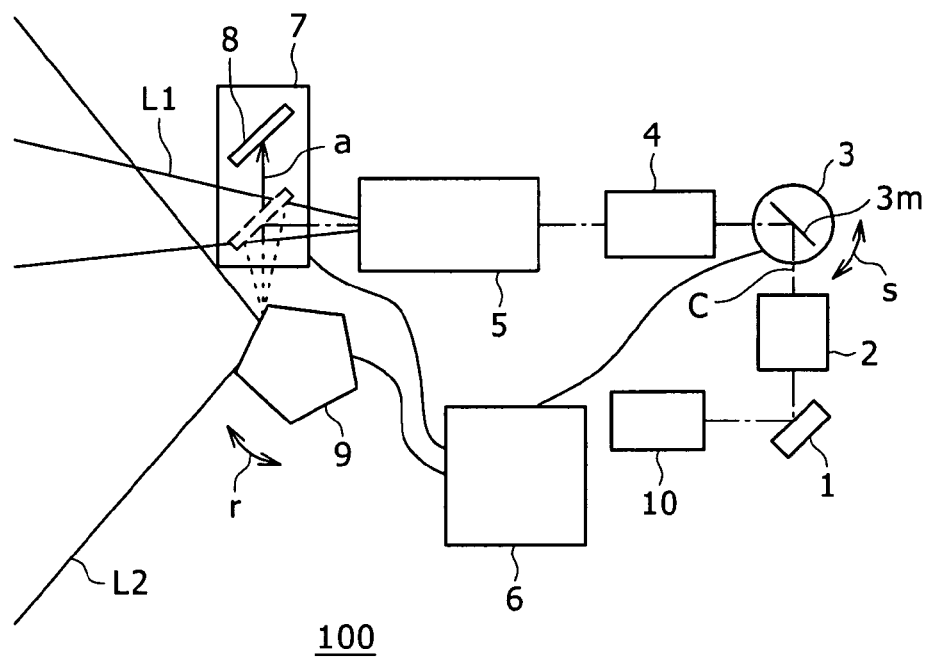
FIG. 1 is a plan view showing a construction of an image projecting apparatus according to an embodiment of the present invention.

FIG. 1 shows a schematic constructional view of an image projecting apparatus according to an embodiment of the present invention.

The image projecting apparatus 100 is composed of a light source 10, a one-dimension type light modulating device 1, a relay optical system 2 constituted by an Offner relay or the like, a first light deflecting device 3, a correction optical system 4, a projection optical system 5 such as a projection lens, a controller 6, a movement mechanism 7, an optical system 8 constituted by a folded mirror or the like, and a second light deflecting device 9. In this case, the correction optical system 4 carries out image plane curvature correction, aberration correction, and the like. Also, the movement mechanism 8 moves the optical system 8.

A light modulating element such as a phase reflection type diffraction grating, for example, typified by a Grating Light Valve (GLV) manufactured by Silicon Light Machines Corporation in USA can be used as the one-dimension type light modulating device. Diffraction grating-like light modulating elements are arranged in line so as to correspond to a plurality of pixels, respectively, in a direction vertical to the paper having FIG. 1 drawn thereon in the one-dimension type light modulating device 1 using such a phase reflection type diffraction grating. Also, a one-dimensional (line-like) coherent light is radiated to the diffraction grating-like light modulating elements along a major axis (longitudinal) direction as an arrangement direction thereof to deform the diffraction gratings by electrostatic drive or the like in accordance with image information. As a result, the coherent light is modulated into a one-dimensional image light corresponding to the image information to be emitted.

When the one-dimension type light modulating device is constituted by the light modulating elements such as the GLVs, the light source 10 needs to be provided because the light modulating element such as the GLV is of a non-self emission type, and also a coherent light source such as a semiconductor laser needs to be used. When a color image is projected, it is preferable to provide color light sources corresponding to red, blue and green, and a one-dimension type light modulating device corresponding thereto.

It is noted that when a self-emission type element having light emitting diodes or the like arranged in one-dimension therein is used as the one-dimension type light modulating device, it is unnecessary to provide the light source 10 shown in FIG. 1.

The relay optical system 2 is constituted by an Offner relay or the like, and thus is a relay optical system obtained by a combination of reflecting mirrors. Therefore, the relay optical system 2 forms an image at the same magnification as that of a one-dimensional image.

The first light deflecting device 3, for example, is constituted by a galvano-mirror or the like composed of a plane mirror 3m and a section for driving the same. In addition, the first light deflecting device 3 is arranged in front of an image location of the relay optical system 2, and scans the one-dimensional image synchronously with an image signal.

Also, when the first light deflecting device 3 is made to come to rest in an arbitrary position, a one-dimensional intermediate image can be formed between the correction optical system 4 and the projection lens 5. In addition, the plane mirror 3m is pivoted as indicated by an arrow in the figure in a surface (the paper having FIG. 1 drawn thereon) vertical to an arrangement direction of the one-dimension type light modulating device 1 by a drive section such as an actuator (not shown), thereby scanning one-dimensional image light from the one-dimension type light modulating device 1. As a result, a two-dimensional intermediate image can be formed between the correction optical system 4 and the projection optical system 5.

The projection optical system 5 constituted by a projection lens or the like magnifies and projects the one-dimensional intermediate image or planar two-dimensional intermediate image thus formed on an external screen.

The optical system 8 such as a folded mirror has a construction of including the movement mechanism 7 such as a slide mechanism or the like, and is made movable as indicated by an arrow a in FIG. 1. As a result, the case where a light emitted from the projection optical system 5 is straightly propagated as indicated by a solid line in FIG. 1, and the case where an optical path is changed by reflection or the like of a light to the light deflecting device 9 side as indicated by a broken line in FIG. 1 can be switched over to each other.

For example, in a first projection process for projecting an image having a first aspect ratio as a normal horizontal to vertical ratio on a planar screen (not shown), an image light is deflected, i.e., scanned by the first light deflecting device 3 in accordance with a signal outputted from the controller 6 for controlling the apparatus main body. Also, a position of the optical system 8 is adjusted to a position where an emitted light is straightly propagated from the projection optical system 5 in accordance with the signal outputted from the controller 6.

In addition, it is also possible to carry out a second projection process for projecting an image having an aspect ratio different from the first aspect ratio, e.g., a large second aspect ratio having a transverse length relatively larger than a longitudinal length on a cylindrical screen (not shown) or the like. In this case, the first light deflecting device 3 is stopped at a predetermined position and also a position of the optical system 8 is adjusted to a position where a light emitted from the projection optical system 5 is reflected to the second light deflecting device 9 side in accordance with a signal outputted from the controller 6. That is to say, the second projection process is carried out such that a reflection portion such as a folded mirror is inserted into an optical axis of an image light to direct the image light to the second light deflecting device 9.

A polygon mirror having a regular polygon in cross section and a section for driving the same, a plane mirror and a section for driving the same, or the like, for example, can be used as the second light deflecting device 9. When the position of the optical system 8 is adjusted in the manner described above so that the image light is guided to the second light deflecting device 9 by, for example, the reflection portion such as the folded mirror, the construction is adopted such that the one-dimensional image is scanned synchronously with the image signal and is projected by utilizing the post-projection scan system. In this case, it is possible to adopt the construction that the image is projected on the cylindrical screen or the like, for example, at the second aspect ratio.

Note that, the case where the optical system 8 constituted by the folded mirror is moved by the slide mechanism or the like to change the optical path over to another one. Of course, however, the constitution that the movement mechanism is provided in the second light deflecting device 9 itself, and the second light deflecting device 9 is moved by the slide mechanism or the like to change the optical path over to another one can also be adopted depending on the arrangement or the like of, for example, the planar screen and the cylindrical screen.

In addition, the movement mechanism provided in the optical system 8 or the second light deflecting device 9 can be constituted by a rotation mechanism or the like in addition to the slide mechanism.

According to the image projecting device 100 having such a construction, it is possible to realize an image projecting method, according to the present invention, with which a part of the light deflecting device is stopped, detached or made movable, or which additionally uses any other suitable light deflecting device. According to the image projecting method of the present invention, the image lights having the different aspect ratios can be simply switched over to each other, and the deflecting device is changed in its construction, which results in that the deterioration of the image quality can be suppressed in each of the projection methods.

Figure 2:
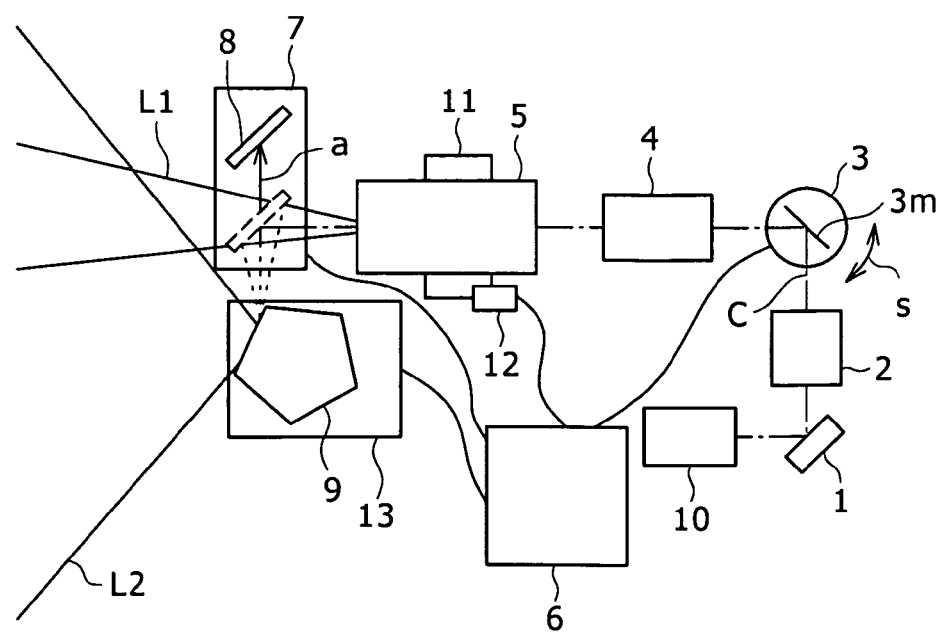
FIG. 2 is a plan view showing a construction of a change of the image projecting apparatus according to the embodiment of the present invention.

FIG. 2 shows the case where position adjusting mechanisms 11 and 13 are provided in the projection optical system 5 and the second light deflecting device 9, respectively, as a change of the image projecting apparatus according to the embodiment of the present invention. In FIG. 2, portions corresponding to those in FIG. 1 are designated by the same reference numerals, respectively, and a repeated description is omitted here for the sake of simplicity.

The position adjusting mechanism 11 provided in the projection optical system 5 may be constructed as follows. That is to say, for example, the projection lens 1 of the projection optical system 5 can be adjusted in its position in the arrangement direction of the one-dimension type light modulating device 1, i.e., in the extension direction, of the one-dimensional image light, as the direction vertical to the paper having FIG. 2 drawn thereon in this case. Thus, the image can be moved, for example, in the vertical direction of the screen. In addition thereto, the projection optical system 5 may be constructed as follows. That is to say, for example, the adjustment for the left-hand side and the right-hand side, the zoom adjustment, and the like of the projection lens can be carried out.

The position adjusting mechanism 13 provided in the first light deflecting device 9 can move the position of the second light deflecting device 9 in correspondence to the position of the light emitted from the projection optical system 5. It is feared that in the second light deflecting device 9, the optical path is radiated to a portion other than the mirror portion of the second light deflecting device 9 depending on the position of the projection optical system 5, and thus the edge of the image on the screen becomes dark. In order to avoid this situation, the second light deflecting device 9 is moved so that a position of the second light deflecting device 9 comes to be aligned with a position data on which is previously stored in a memory portion of the controller 6 in correspondence to the position of the lens or the like of the projection optical system 5 detected by a position detection sensor.

By adopting such a construction, the number of optical parts of the second light deflecting device 9 can be held to a minimum, the costs of the optical parts can be lowered, and the miniaturization and low power consumption of the section for driving the second light deflecting device 9 can be realized.

Figure 3:
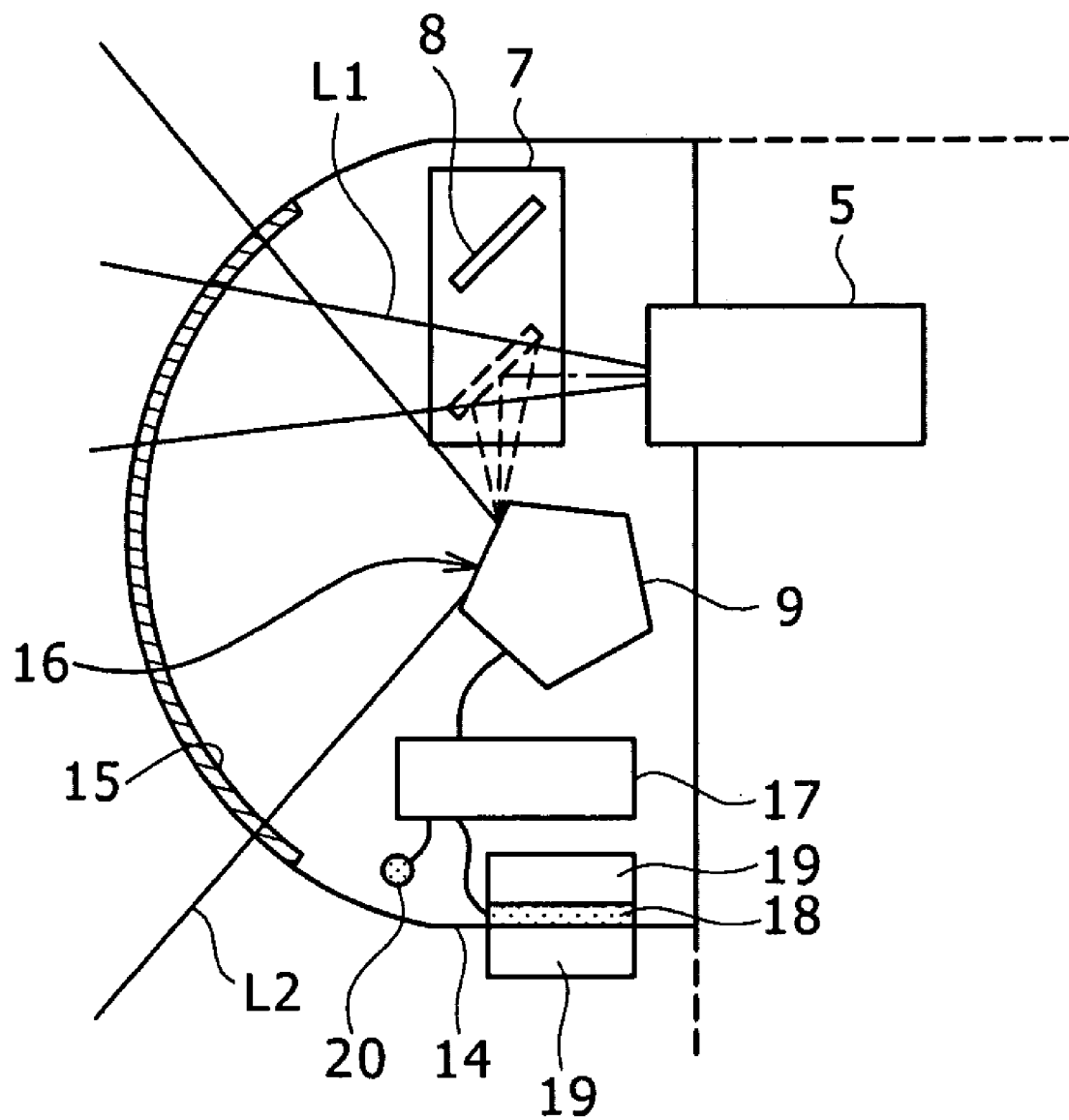
FIG. 3 is a plan view showing a construction of a main portion of another change of the image projecting apparatus according to the embodiment of the present invention.

FIG. 3 shows an example, in which the entire constituent elements such as the second light deflecting device 9 and the optical system 8 is covered with one chassis 14, as another change of the image projecting apparatus according to the embodiment of the present invention.

The chassis 14 covers the optical system 8 provided with the movement mechanism 7, the second light deflecting device 9, and the controller 17 for the same. Also, the chassis 14 can be mounted to a light emitting portion of the projection optical system 5 with its construction of not light-shielding the optical path of the image light. Also, a window 15 which transmits a light is provided both on an emission optical path of the projection optical system 5 of the chassis 14, and on an emission optical path of the second light deflecting device 9 thereof. As a result, for example, both the image light, having the first aspect ratio, which is scanned by, for example, the first light deflecting device (not shown) provided inside the image projecting apparatus, and the image light, having the second aspect ratio, which is scanned by the second light deflecting device 9 are projected on the outside. Thus, both the images corresponding to these image lights are satisfactorily displayed.

In addition, by adopting the construction of covering the portion for emitting the image light with the chassis 14 including the window 15 in such a manner, it is possible to enhance the safety for the hands and fingers against the movable mechanism, and the safety for the eyes against the laser beam. In addition thereto, it is possible to prevent the grit and dust from being stuck to the optical parts.

Moreover, a cross section of the window 15 preferably has a circular shape which is formed with a reflecting surface 16 of the second light deflecting device 9 approximately as a center. Adoption of the circular shape in cross section of the window 15 offers the following advantages. That is to say, a safety region against the laser beam can be ensured at a minimum volume to miniaturize the chassis 14, and also a transmittance of the window 15 is readily ensured.

In addition, for example, in order to safely hold an intensity of the projected light, an interlock mechanism, so to speak, a safety mechanism for mutually limiting the operations of the first and second light deflecting devices, or inhibiting the operations of the first and second light deflecting devices may be provided in the image projecting apparatus of this embodiment.

For example, while not illustrated in any of the figures, there may be provided a position detecting sensor for detecting the position of the folded mirror or the like provided in the optical system 8. In this case, the position detecting sensor detects whether the folded mirror is in a first projection state in which it is located in the position where the emitted light from the projection optical system 5 is straightly propagated, or in a second projection state in which it is located in a position where that emitted light is reflected to the light deflecting device 9, or whether the folded mirror is neither in the first projection state nor in the second projection state.

Moreover, a suitable interlock method can be selected so that the emitted light from the projection optical system 5 does not come to have an unexpected intensity based on the information obtained from the position detecting sensor. When the constituent element of the optical system 8, for example, the folded mirror is located in the position where the emitted light is straightly propagated as indicated by a solid line in FIG. 3, for example, the interlock is operated in the controller 6 so that no light is permitted to be emitted unless the first light deflecting device 3 normally operates. When the constituent element of the optical system 8, for example, the folded mirror is located in the position where the emitted light is reflected to the second light deflecting device 9, the interlock is similarly operated so that no light is permitted to be emitted unless the second light deflecting device 9 normally operates. That is to say, the construction is adopted such that while the operation of the first or second light deflecting device 3 or 9 is stopped although being supposed to be valid, no image light is emitted to the outside.

In addition, when the constituent element of the optical system 8, for example, the folded mirror is neither in the first projection state nor in the second projection state, the light emission is inhibited. When there is adopted the construction including such an interlock mechanism, it is possible to enhance the safety for the image projecting apparatus.

Note that, the example described above has shown the case where the position detecting sensor is mounted to the movement mechanism 7 provided in the optical system 8. However, even in the case where there is adopted a construction that the second light deflecting device 9 itself is moved by the slide mechanism or the like to change the optical path over to another one, it is, of course, possible to adopt a construction of similarly providing the interlock mechanism by mounting the position detecting sensor to the movement mechanism.

Now, a rotating speed of the second light deflecting device 9 slightly changes due to a change in ambient temperature, and transverse swinging occurs in the image, for example, projected on the cylindrical screen owing to the influence of the slight change in rotating speed. In order to reduce this transverse swinging, it is effective that a temperature in the chassis 14 is adjusted to be held at given one. FIG. 3 shows, as an example, another change of the image projecting apparatus according to the embodiment in which heat exchangers 19 are provided on a heat absorbing surface and a heat radiating surface of a temperature controlling element 18 such as a Peltier element, respectively, and the temperature adjustment is performed so that the temperature in the chassis 14 is controlled to fall within a given range.

Figure 4A:
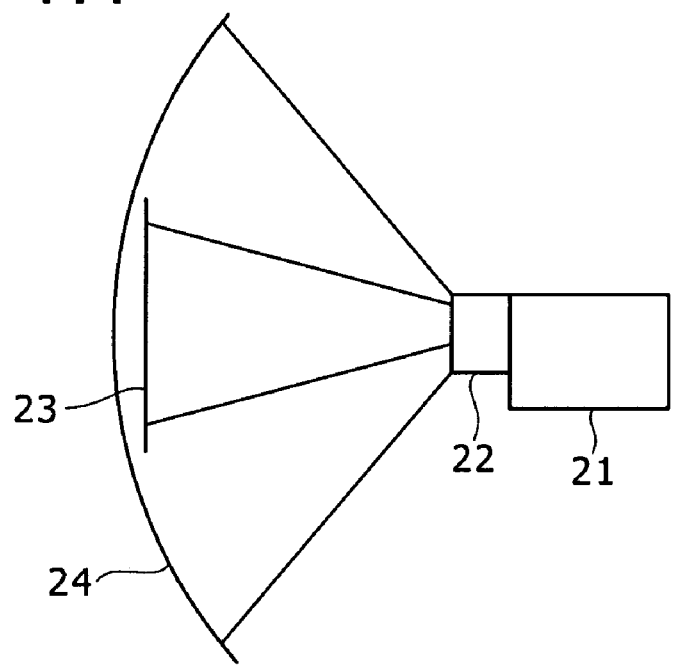
FIGS. 4A and 4B are respectively plan constructional views explaining an image projecting method according to an embodiment of the present invention.
Figure 4B:
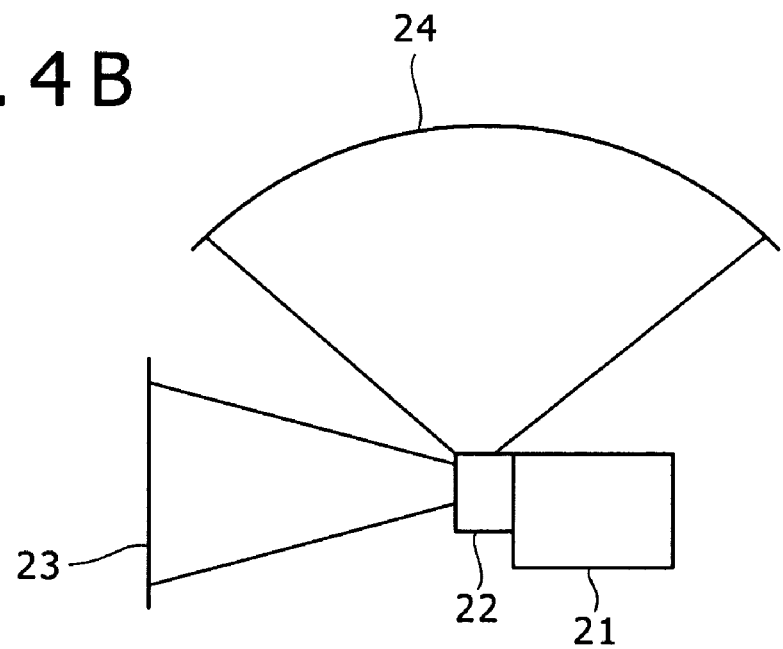

FIGS. 4A and 4B respectively show constructional example in the case where the image light is projected on an external screen by the image projecting apparatus 21 according to the embodiment of the present invention. Referring to FIG. 4A, a deflection device 22 including the second light deflecting device 9, the optical system 8 and the movement mechanism 7 which have the respective constructions, for example, shown in FIG. 3, the controller 17, and the like is detachably mounted to the emission side of the image projecting apparatus 21. Also, when the image light is scanned by the first light deflecting device 3 to be projected on a screen, the projection is carried out by utilizing the pre-projection scan system. Thus, as shown in FIG. 4A, the image having the normal aspect ratio, i.e., the relatively small horizontal to vertical ratio is projected on a planar screen 23. In the case of utilizing the pre-projection scan system, as previously stated, the image light can be projected on the planar screen 23 to display the satisfactory image containing the suppressed deformation without correcting the image signal.

On the other hand, when the image light is scanned by the second light deflecting device 9 to be projected on a screen, the projection is carried out by utilizing the post-projection scan system. When the image is projected on a cylindrical screen 24, the image having the large horizontal to vertical ratio, i.e., the large aspect ratio can be displayed with the satisfactory image quality without generating the deformation in the four corners or the like of the cylindrical screen 24. Also, the image which is excellent in realistic sensation can be displayed on the screen.

As has been described so far, according to the embodiment of the present invention, it is possible to provide the image projecting apparatus which is capable of simply projecting the image on the planar screen with the satisfactory image quality when the aspect ratio is small while on the cylindrical screen with the satisfactory image quality when the aspect ratio is large.

In addition, with the image projecting apparatus according to the embodiment of the present invention, it is possible to display the image containing no deformation in the four corners of the screen when the image is projected on the cylindrical screen in the case of the large aspect ratio as well as when the image is projected on the planar screen in the case of the small aspect ratio.

Moreover, when the phase reflection type and diffraction grating type electrostatic driving element is used as the one-dimension type light modulating device in the image projecting apparatus according to the embodiment of the present invention, the light interference is utilized by using the coherent light such as the laser beam. Therefore, the gradation is controlled with the high precision, thus allowing the high-quality image to be displayed.

In the image projecting apparatus according to the embodiment of the present invention, the entire constituent elements such as the second light deflecting device, the optical system, the movement mechanism, and the controller are covered with one chassis. As a result, it is possible to enhance the safety for the hands and fingers against the movable mechanism, and the safety for the eyes against the laser beam. Also, it is possible to prevent the grit and dust from being stuck to the optical parts.

In addition, the position detecting sensor 12 detects the position of the second light deflecting device or the optical system to actuate the suitable interlock operation. As a result, it is possible to prevent the emitted light having the unexpected intensity from being outputted, and thus it is possible to further enhance the safety.

It is noted that the image projecting apparatus according to the present invention is by no means limited to the embodiment described above. That is to say, it is to be understood that various changes and modifications can be made for the kinds of other one-dimension type light modulating devices, and the constituents of the materials thereof, the constructions of the optical parts within the modulation optical system, and the like without departing from the gist of the present invention.

In addition, it is also possible to adopt a construction that the operation of the light deflecting device is controlled, thereby allowing the images having three or more kinds of aspect rations to be projected.

It should be understood by those skilled in the art that various modifications, combinations, sub-combinations and alterations may occur depending on design requirements and other factor in so far as they are within the scope of the appended claims or the equivalents thereof.

What is claimed is:

1. An image projecting apparatus, comprising:
a one-dimension type light modulating device for modulating a light in accordance with image information;
a projection optical system; and
a light deflecting device for deflecting an image light in a direction approximately perpendicular to an extension direction of a one-dimensional image light emitted from said one-dimensional light modulating device;
wherein said light deflecting device is composed of a first light deflecting device arranged between said projection optical system and said one-dimension type light modulating device, and a second light deflecting device arranged on an emission side of said projection optical system;
said second light deflecting device is detachably mounted.

2. The image projecting apparatus according to claim 1, further comprising:
a movement mechanism provided in said second light deflecting device;
a position detecting sensor provided in said projection optical system; and
a controller for controlling a movement amount of said movement mechanism provided in said second light deflecting device in accordance with a detected value outputted from said position detecting sensor.

3. The image projecting apparatus according to claim 1, further comprising a temperature controller for controlling temperatures of said second light deflecting device and said controller for the same.

4. The image projecting apparatus according to claim 1, further comprising a chassis for covering said second light deflecting device.

5. The image projecting apparatus according to claim 4, wherein a cross section of a region through which the light emitted from said second light deflecting device covered with said chassis passes is formed in circular shape with an emission position of said second light deflecting device approximately as a center.

6. An image projecting apparatus, comprising:
a one-dimension type light modulating device for modulating a light in accordance with image information;
a projection optical system; and
a light deflecting device for deflecting an image light in a direction approximately perpendicular to an extension direction of a one-dimensional image light emitted from said one-dimensional light modulating device;
wherein said light deflecting device is composed of a first light deflecting device arranged between said projection optical system and said one-dimensional light modulating device, and a second light deflecting device arranged on an emission side of said projection optical system; and
an optical system arranged in said second light deflecting device, or between said second light deflecting device and said projection optical system is provided with a movement mechanism.

7. The image projecting apparatus according to claim 6, further comprising:
- a movement mechanism provided in said second light deflecting device;
- a position detecting sensor provided in said projection optical system; and
- a controller for controlling a movement amount of said movement mechanism provided in said second light deflecting device in accordance with a detected value outputted from said position detecting sensor.

8. The image projecting apparatus according to claim 6, wherein said first light deflecting device, a controller for the same, and said movement mechanism are detachable from a main body of said image projecting apparatus.

9. The image projecting apparatus according to claim 6, further comprising a temperature controller for controlling temperatures of said second light deflecting device and said controller for the same.

10. The age projecting apparatus according to claim 6, further comprising a chassis for covering said second light deflecting device, said movement mechanism, and said optical system.

11. The image projecting apparatus according to claim 10, wherein a cross section of a region through which the light emitted from said second light deflecting device covered with said chassis passes is formed in circular shape with an emission position of said second light deflecting device approximately as a center.

12. The image projecting apparatus according to claim 6, further comprising a position detecting sensor for detecting a movement position of an optical system provided in said second light deflecting device provided with said movement mechanism, or between said second light deflecting device and said projection optical system;
- wherein whether there is provided a first projection state in which the projection is carried out without performing the deflection by said second light deflecting device, or a second projection state in which the deflection is carried out by said second light deflecting device is automatically recognized based on position information obtained from said position detecting sensor; and
- wherein said image projecting apparatus further comprises an interlock function of limiting an intensity of the emitted light in correspondence to the first projection state and the second projection state.

13. An image projecting method, comprising the steps of:
- emitting an image light obtained by modulation by a light modulating device through a first light deflecting device and a projection optical system to project an image light having a first aspect ratio; and
- emitting an image light obtained by modulation by said light modulating device through a second light deflecting device arranged on an emission side of said projection optical system to project an image light having a second aspect ratio different from the first aspect ratio.

14. The image projecting method according to claim 13, further comprising the step of:
- inserting a reflection portion into an optical axis of the image light between said projection optical system and said second light deflecting device, said insertion step being provided between said step of projecting an image light having a first aspect ratio and said step of projecting an image light having a second aspect ratio.

\* \* \* \* \*